April 9, 1935. F. H. RICHTERKESSING 1,997,015

ELECTRICALLY OPERATED TRACK SWITCH

Original Filed June 25, 1928

INVENTOR
Frank H. Richterkessing.
BY John L. Milton
ATTORNEY

Patented Apr. 9, 1935

1,997,015

UNITED STATES PATENT OFFICE 1,997,015

ELECTRICALLY OPERATED TRACK SWITCH

Frank H. Richterkessing, Louisville, Ky., assignor to Cheatham Electric Switching Device Company Application June 25, 1928, Serial No. 288,225
Renewed November 30, 1931

20 Claims. (Cl. 246—228)

My invention relates to electrically operated track switches operated automatically from the car.

One object of my invention is to produce a system that works "power on" or "power off", the system as hereinafter described.

Another object of my invention is to provide a system which will limit the flow of operating current to the track switch operating mechanism to a predetermined period.

Another object of my invention is to produce a system in which independent cooperating means are employed in controlling the direction of operation of the track switch.

A still further object of my invention is to provide a system, which will avoid the breaking of any currents by the current collector or trolley wheel which may be of sufficient magnitude to cause a destructive arc.

Another feature of my invention is to provide a safe control system embodying relays and circuits of much simpler nature than heretofore used in combination with electric track switch operation. This feature is highly desirable for production and service.

My invention resides in the new and novel combination, construction and relation of the various electrically operated switches, circuits and other parts hereinafter more fully described and disclosed in the drawing.

In the drawing accompanying my specification:

My invention is intended primarily for the use with those cars which are operated by means of an overhead trolley wheel or current collector W mounted on the car by means of a trolley pole T although it may be operated by cars in which current is supplied thereto by other methods. Most cars are equipped with heaters H, lights L, air compressors F, which are connected between the trolley pole and ground. The cars are equipped with operating motors M and a controller A therefor, which is under control of the car operator. When the controller A is closed, current will flow through the motors M and this position I term "power on", and when the controller is open no current will flow thru the motors and this position I term "power off". The controller A does not in any way control the current flowing thru the apparatus H, L, and F, which I term the auxiliary car current. The current flowing through the motors flows to ground G. I have arranged this system herein described so that the track switch will be operated to the "straight ahead" position when the current collector W engages the trolley contactor P with "power off", and the track switch will be thrown to the "curve" position when the current collector engages the system using "power on". This operation of the track switch, however, may be reversed by merely transposing the connections of the track switch operating solenoids and it is accepted that this change is evident to those skilled in the art.

Figure 1:
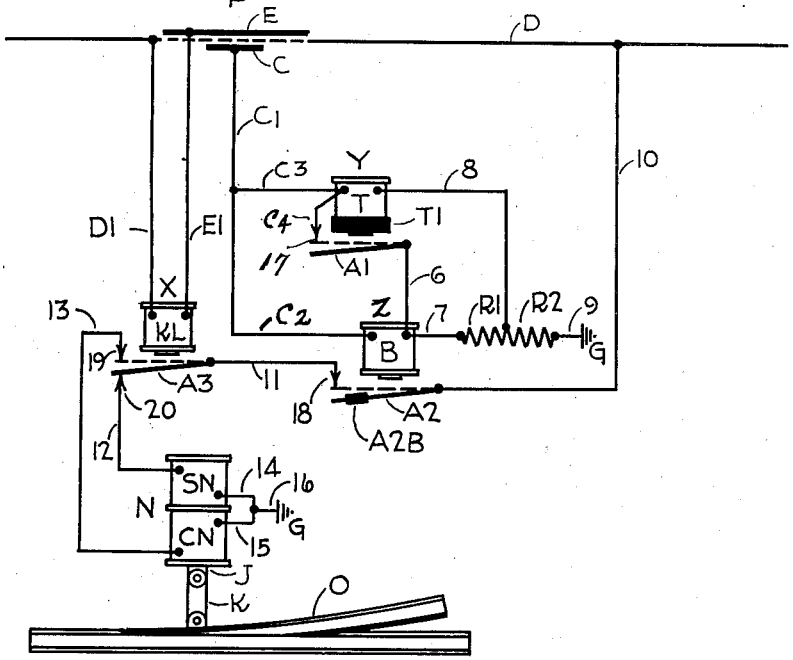
Fig. 1 is a schematic drawing showing the arrangement of parts and circuits when the system is in a normal condition. Under such circumstances, however, the switch tongue may be in either of its operable positions.
Figure 2:
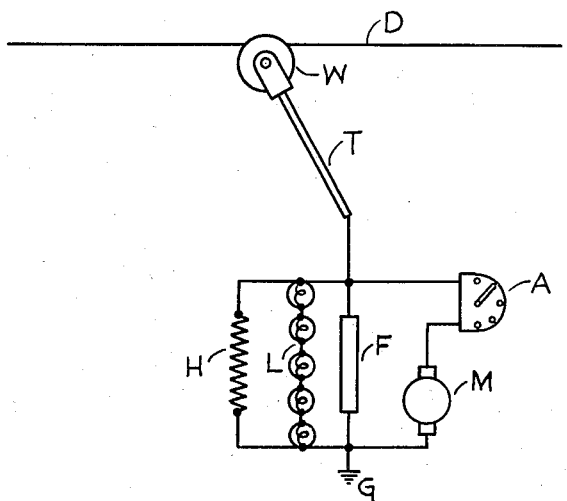
Fig. 2 is a schematic drawing showing the general arrangement of circuits usually found in an electrically operated car and which are taken care of in the operation of my invention.

In the system shown in Fig. 1, the letter D represents a trolley wire or conductor. Positioned adjacent the trolley conductor is a pan or trolley contactor P provided with two contact members E and C, which are usually parallel and normally insulated from each other. The member E is electrically connected to the trolley conductor at all times, but the member C is normally insulated therefrom, but is electrically connected thereto when the collector W engages the pan or trolley contactor P. The contact members E and C are so related to the trolley conductor that when the current collector engages the contact members it will be out of engagement with the trolley conductor and remain so until it is about to pass out of engagement with the pan or trolley contactor. Such arrangement of the contact members and conductor is well known to those skilled in the art.

I also employ an electrically operated track switch N provided with two solenoids SN and CN each having a connection to the ground, thru the common conductor 16.

The solenoids are provided with a reciprocating plunger J which is drawn inwardly when the solenoid SN is energized and drawn outwardly when the solenoid CN is energized. The plunger J is connected to the switch tongue O by means of the connecting link K. I also employ an electrically operated normally open relay X provided with an operating coil KL and switch arm A3. The coil KL is mounted on a magnet core which is also true of the other switch coil later referred to, although a magnet plunger may be substituted for a magnet core as is well known in the art. One terminal of the coil KL is connected to the contact member E of trolley contactor P by wire E1, and the other coil terminal is connected to trolley conductor D by wire D1. Relay X is provided with a normally open front contact 19 and a normally closed back contact 20. The normally closed back contact 20 is connected to the solenoid SN by wire 12. The normally open front contact 19 is connected to track switch solenoid CN by wire 13. The switch arm A3 is normally in its free state; that is, not influenced by any magnetic flux, and rests against the normally closed contact 20, which is a back contact of relay X. The retarded pick-up relay Y that I employ has in addition to its operating coil T, a copper slug T1 and an armature A1. Armature A1 is connected to one coil terminal of coil B by relay Z by wire 6; the other coil terminal of coil T is a common connecting point for wires C3 and C4. The other relay Z that I employ is equipped with an operating coil B and a switch arm A2. The switch arm A2 is normally in its free state and operates into contact engagement with the normally open front contact 18 which is located within a magnetic blowout arc shunt represented by A2b. The purpose of this arrangement is, that any heavy or deteriorating arcs that may occur at this point will be extinguished very readily within the magnetic field as is well known to those skilled in the art. Armature A2 of relay Z is connected to the trolley conductor D by wire 10. Front contact 18 is connected by wire 11 to armature A3 of relay X. One coil terminal of coil B is a common connecting point for wires 6 and 7; the other coil terminal of coil B is connected to contact member C of trolley contactor P, through wires C2 and C1.

The retarded pickup factor that I employ on the relay Y may be brought about by various well known constructed principles. Such devices as a copper slug or sleeve about the core of a coil, as indicated by T1 may be employed, or the retarded pickup feature may be brought about by spacing the armature with respect to the core when the armature is in the open position, or a combination of these methods, or by a dash pot arrangement.

If the current collector W engages the trolley contactor P with "power off", the contact members E and C will be electrically connected and of the same potential as the trolley wire, as the contact member E is electrically connected to the trolley conductor D at all times through wires D1 and E1, wire D1 connecting the trolley conductor D and the low resistance coil KL, and the wire E1 connecting the other terminal of coil KL and contact member E. Coil KL is of a very low resistance, as it usually consists of 10 or 12 turns of #6 copper wire. Relay X is a "current selective" relay, that is, a very heavy current must pass through its operating coil KL before it can affect its armature A3. As soon as contact member C is electrically connected to the trolley conductor, thru the manner just mentioned, current will flow from the trolley conductor D, through wire D1, coil KL, wire E1, contact member E, current collector W, contact member C, wire C1, wire C2, coil B of relay Z, wire 7, resistance unit R1, resistance unit R2, wire 9 to ground G, and the armature A2 will be raised into contact engagement with the normally open front contact 18 of relay Z. Instant to the energization of this circuit, a circuit was established feeding from the trolley conductor D, as just mentioned, feeding through wire C1, wire C3, coil T of relay Y, wire 8, resistance unit R2, wire 9 to ground G, and the armature A1 was raised into contact engagement with the normally open front contact 17 after a predetermined time, established thru the retarding action of the copper slug T1 about the core of coil T of relay Y. When the armature A2 was brought into contact engagement with the normally open front contact 18, a circuit was established feeding from the trolley conductor D, thru wire 10, armature A2, magnetic blowout coil A2b, front contact 18 of relay Z, wire 11, armature A3 of relay X, back contact 20 of relay X, wire 12, solenoid SN of track switch N, wire 14, wire 16 to ground G, and the solenoid SN of track switch N was energized and an operation of the track switch tongue O resulted, placing the tongue for a straight ahead car movement. After the predetermined time factor of relay Y, contact arm A1 of relay Y was brought into contact engagement with the normally open front contact 17 of relay Y, and operating coil B of relay Z was shunted, that is, was deenergized by short circuiting the flow of current through the coil. The shunting circuit established by the contact arm A1 of relay Y fed from contact member C of trolley contactor P through wire C1, wire C3, wire C4, front contact 17 of relay Y, armature A1, wire 6, to one coil terminal of coil B of relay Z, thence through wire 7, resistance unit R1, resistance unit R2, wire 9, to ground G. This operation connected the coil terminals of coil B together through the loop formed by wires C2, C3, C4, front contact 17, armature A1 and wire 6. As long as the current collector W engaged the trolley contactor P, this condition would exist, rendering the relay Z inoperative against subsequent operations and thereby afford adequate protection for the track switch solenoids, but as soon as the current collector W disengaged the trolley contactor P, the relay system would be restored to a normal condition wherein the relay Z would be operative for a following car movement.

If the current collector initially engages the trolley contactor P with "power on", the coil KL of relay X will be instantly energized and pick up armature A3 into contact engagement with the normally open front contact 19 of relay X. As soon as the current collector W advances and makes contact engagement with the contact member C as heretofore mentioned, relays Y and Z will pass through the same cycle of operations and the armature A2 of relay Z will be raised into contact engagement with the normally open front contact 18 as heretofore described and a circuit will be established feeding from the trolley conductor D, through wire 10, armature A2 of relay Z, magnetic blowout coil A2b, normally open front contact 18 of relay Z, wire 11, armature A3 of relay X, front contact 19 of relay X, wire 13, solenoid CN of track switch N, wire 15, wire 16, to ground G, and the solenoid CN will be energized and the switch point O will be operated to the "curved" position. As soon as the current collector W disengages the trolley contactor P, the system will be restored to a normal operating condition.

To sum up the operation of the system, if the car operator desired to go straight ahead, he sets his controller with "power off" with the intention of coasting past the trolley contactor P. As soon as the current collector W engages the trolley contactor P, relay Z will effect an operation of the track switch to the straight ahead position through the cooperation of the predetermined selection of relay X.

If the car operator desires to take the "curve", he will turn his controller to "power on", with the intention of passing the trolley contactor drawing power. When the current collector W engages the trolley contactor P with "power on", relay Z will effect an operation of the track switch to the curved position through the cooperation of the predetermined selection of relay X.

There are, of course, modifications and arrangements of parts which may be made from that shown in the above disclosure, and which will still fall within the scope of my invention.

I claim:—

1. A switch operating system comprising in combination, a trolley conductor, a contact pan carried thereby and adapted to be engaged by a current collector, an electrically operated track switch, a relay to control the direction of movement of the track switch, a normally open relay to control the track switch operating circuit, a relay to control the latter relay, the two last mentioned relays being equipped with operating coils normally connected in parallel and having a common connection to the trolley contact pan and connections to the ground thru a resistor whereby the current collector engaging said contact pan will simultaneously effect energization of said operating coils through said connections.

2. In a switch operating system, the combination of an electrically operated track switch, a switch operating circuit, a circuit changer to direct current into the track switch to automatically control its direction of operation, an electrically operated control relay provided with an operating coil having a connection to the ground through a resistor, and an electrically operated means provided with an operating coil arranged in shunt with the first mentioned coil and a portion of the said resistor, said means operable to shunt out the control relay.

3. In a switch operating system, the combination of an electrically operated track switch, a switch operating circuit, a circuit changer to direct current into the track switch to automatically control its direction of operation, an electrically operated control relay provided with an operating coil having a connection to the ground through a resistor, and an electrically operated means provided with an operating coil arranged in shunt with the first mentioned coil and a portion of the said resistor, said means operable to shunt out the said control relay after a predetermined time to open the said switch operating circuit.

4. In a switch operating system, the combination of an electrically operated track switch, a switch operating circuit, a circuit changer operable to direct current into the track switch to automatically control its direction of operation, an electrically operated relay provided with an operating coil having a connection to ground through a resistor, said relay operable to control the said normally open track switch operating circuit, and a second electrically operated retarded pickup relay provided with an operating coil connected in shunt with the first mentioned coil and a portion of the said resistor, said second relay operable after a predetermined time to shunt out the control relay and retain it shunted as long as the current collector engages the contactor.

5. A switch operating system comprising in combination, an electrically operated track switch, circuits and electrical means therefor to operate the track switch to the desired position, a traveling current collector, a relay affected by the said current collector for first closing and then opening one of said circuits when the device is in use to render the track switch operative for a predetermined time, an operating coil for the said relay, and an electrically operated means having an operating coil normally connected in shunt with the former coil and to the same source of operative power, said means operable to short circuit the said coil of the first mentioned relay to render the switch operating circuit inoperative after a predetermined time.

6. A track switch operating system comprising in combination, a trolley conductor, a contact pan to be engaged by a current collector, an electrically operated track switch, a relay X to control the direction of movement of the track switch, a relay Z to control current flow to the track switch and normally open, a relay Y to control the opening of relay Z, windings on the relays Z and Y, normally connected in shunt and having connections to the pan and to the ground for operation when the collector engages the pan, a divided circuit from the trolley conductor to the track switch controlled by the relays X and Z, a normally open circuit controlled by the relay Y to short circuit the said winding of relay Z after relay Z has operated to establish a current flow to the said track switch.

7. In a track switch operating system, the combination of an electrically operated track switch, a trolley conductor, a contact pan, a normally open circuit connecting the trolley conductor and track switch, a normally open relay to control the said circuit, operating means therefor connected to the pan for operation in closing the said circuit, and electrically operated means having its operating means normally in shunt with the operating means of the said normally open relay, said electrically operated means effective to short circuit the operating means of the said normally open relay.

8. In a track switch operating system, the combination of an electrically operated trackswitch, a trolley conductor, a contact pan provided with a pair of contact members to be engaged by a current collector, a normally open circuit deriving current from the trolley conductor and connected to the track switch, an electrically operated relay to close the said normally open circuit and provided with an operating coil, and means automatically operable to short circuit the said operating coil and provided with another operating coil normally in shunt with the first said operating coil, the second coil also operating to maintain the said means operative to retain the first said coil short-circuited as long as the collector engages the pan.

9. A track switch operating system comprising an electrically operated track switch, a trolley conductor, a pan provided with a pair of contact members to be electrically connected when engaged by a current collector, a circuit changing relay to control a pair of branch circuits leading to the track switch, an operating coil for the circuit changer connected between the trolley conductor and one contact member, a circuit leading from the trolley conductor to the circuit changer, electrically operated means to control the last said circuit comprising a pair of cooperating switches each having an operating coil normally connected in shunt between the other contact member and the ground and operating to close the said circuit when the collector engages the pan and to open same after a predetermined time after closing and to remain open as long as the collector engages the pan.

10. In a track switch operating system the combination of, contact members, a trolley conductor to be engaged by a current collector, a switch point, means to control the direction of operation of the said switch point, a circuit for conducting current to the said means, an electrically operated circuit closer to control the said circuit and an electrically operated switch to control the said circuit closer, said electrically operated switch provided with an operating coil normally connected in parallel with the operating means of the said circuit closer with electrical connections to one contact member and ground for deriving its operating current from the contact members when the collector engages the said contact members.

11. A track switch operating system comprising in combination, an electrically operated track switch, circuits and electrically operated means therefor to operate the track switch to the position desired, a switch for first closing and then opening one of said circuits after a predetermined time when the device is in use so that a current collector will first close said circuit and later open the same to render the track switch operative during the time the said switch is closed, an operating coil for the switch, and electrically operated means having an operating coil normally connected in shunt with first said coil to short circuit the said first coil to render it non-effective after a predetermined time.

12. In a track switch operating system, the combination of an electrically operated track switch, a switch operating circuit, a circuit changer to direct current into the track switch to automatically control its direction of operation, an electrically operated switch provided with an operating coil to control the switch and electrically operated means provided with an operating coil normally in shunt with the other coil to short circuit the control switch, and means for operating the said circuit changer before operating the said control switch.

13. A track switch operating system comprising an electrically operated track switch, a trolley conductor, a pan provided with a pair of contact members to be electrically connected when engaged by a current collector, a circuit changing relay to control a pair of branch circuits leading to the track switch, an operating coil for the circuit changer connected between the trolley conductor and one contact member, a circuit leading from the trolley conductor to the circuit changer, electrically operated means to control the last said circuit comprising a pair of cooperating switches each having an operating coil normally connected in shunt between the other contact member and the ground and operating to close the said circuit when the collector engages the pan and to open same after a predetermined time after closing and to remain open as long as the collector engages the pan, and means for operating the said circuit changing relay before operating the said electrically operated means.

14. In a track switch operating system the combination of contact members, a trolley conductor to be engaged by a current collector, a switch point, means to control the direction of operation of the said switch point, a circuit for conducting current to the said means, an electrically operated circuit closer to control the said circuit and an electrically operated switch to control the said circuit closer, said electrically operated switch provided with an operating coil normally connected in parallel with the operating means of the said circuit closer with electrical connections to one contact member and ground for deriving its operating current from the contact members when the collector engages the said contact members, and means for selectively controlling the current flow to the first said means operable before operating the said electrically operated circuit closer.

15. A track switch operating system comprising in combination, an electrically operated track switch, circuits and electrical means therefor to operate the track switch to the desired position, a traveling current collector, a relay affected by the said current collector for first closing and then opening one of said circuits when the device is in use to render the track switch operative for a predetermined time, an operating coil for the said relay, electrically operated means connected in parallel with the coil of the said relay operable to effect a de-energization of the coil of the first mentioned relay to render the switch operating circuit inoperative, the said operating coil and electrically operated means arranged to be simultaneously connected to the same source of power.

16. A track switch operating system comprising in combination, an electrically operated track switch, circuits and electrical means therefor to operate the track switch to the desired position, a traveling current collector, a relay affected by the said current collector for first closing and then opening one of said circuits when the device is in use to render the track switch operative, an operating coil for the said relay, electrically operated means connected in parallel with the coil of the said relay operable to effect a deenergization of the coil of the first mentioned relay to render the switch operating circuit inoperative after a predetermined time, the said operating coil and electrically operated means arranged to be simultaneously connected to the same source of operative power.

17. A track switch operating system comprising in combination, an electrically operated track switch, circuits and electrical means therefor to operate the track switch to the desired position, a traveling current collector, a relay affected by the said current collector for first closing and then opening one of said circuits when the device is in use to render the track switch operative for a predetermined time, an operating coil for the said relay, electrically operated means connected in parallel with the coil of the said relay affected by the said current collector to short circuit the coil of the first mentioned relay to render the said switch operating circuit inoperative, the said operating coil and electrically operated means arranged to be simultaneously connected to the same source of power.

18. A track switch operating system comprising in combination, an electrically operated track switch, circuits and electrical means therefor to operate the track switch to the desired position, a traveling current collector, a relay affected by the said current collector for first closing and then opening one of said circuits when the device is in use to render the track switch operative, an operating coil for the said relay electrically, operated means connected in parallel with the coil of the said relay affected by the said current collector to short circuit the coil of the first mentioned relay to render the said switch operating circuit inoperative after a predetermined time, the said operating coil and electrically operated means arranged to be simultaneously connected to a source of power.

19. A track switch operating system comprising in combination, a trolley conductor, a contact pan comprising a pair of contact members carried thereby and adapted to be engaged by a current collector, an electrically operated track switch, a relay to control the direction of movement of the track switch, an operating coil therefor having one end connected to the trolley conductor and the other to one of the said contact members, a normally open relay to control the track switch operating circuit, a relay to control the latter relay, the last two mentioned relays being equipped with operating coils having a common connection to the other contact member and connections to the ground thru a resistor, means whereby a current of less than a predetermined amount can flow thru the first relay, the two last mentioned relays, the resistor to ground, and actuate but the last mentioned relays, and means whereby a current in excess of said predetermined amount may be passed thru the first relay independently of the other relays to actuate it.

20. A track switch operating system comprising in combination, a trolley conductor, a long contact member and a short contact member positioned adjacent the trolley conductor and adapted to be engaged by a current collector, an electrically operated track switch, a relay to control the direction of movement of the track switch, an operating coil therefor having one end connected to the trolley conductor and the other to the said long contact member, a normally open relay to control the track switch operating circuit, a relay to control the latter relay, the operating coils of the last two mentioned relays normally connected in parallel and provided with a common connection to the said short contact member and connections to the ground through a resistor, whereby the current collector engaging said short contact member will simultaneously effect energization of the operating coils for the last two mentioned relays through said connections, and means for selectively energizing the first mentioned operating coil through said connections to the trolley conductor and said long contact member, when the current collector engages said long contact member.

FRANK H. RICHTERKESSING.